United States Patent
Chen (10) Patent No.: US 9,160,512 B2
(45) Date of Patent: Oct. 13, 2015

(54) SEMI-PERSISTENT SCHEDULING METHOD AND APPARATUS

(75) Inventor: Li Chen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 87 days.

(21) Appl. No.: 14/114,633

(22) PCT Filed: Apr. 5, 2012

(86) PCT No.: PCT/CN2012/073544
§ 371 (c)(1),
(2), (4) Date: Oct. 29, 2013

(87) PCT Pub. No.: WO2012/146123
PCT Pub. Date: Nov. 1, 2012

(65) Prior Publication Data
US 2014/0086137 A1  Mar. 27, 2014

(30) Foreign Application Priority Data

Apr. 29, 2011 (CN) .......................... 2011 1 0112001
Aug. 1, 2011 (CN) .......................... 2011 1 0218724

(51) Int. Cl.
H04W 4/06 (2009.01)
H04L 5/00 (2006.01)
H04W 72/12 (2009.01)
H04L 12/18 (2006.01)

(52) U.S. Cl.
CPC ............ *H04L 5/0055* (2013.01); *H04L 5/0053* (2013.01); *H04L 12/18* (2013.01); *H04W 72/12* (2013.01)

(58) Field of Classification Search
CPC ..................................................... H04L 12/189
See application file for complete search history.

(56) References Cited

U.S. PATENT DOCUMENTS

| | | | |
|---|---|---|---|
| 2010/0105390 A1* | 4/2010 | Ishii | ............................ 455/436 |
| 2010/0265870 A1 | 10/2010 | Cai et al. | |
| 2010/0329170 A1* | 12/2010 | Wu | ............................... 370/312 |
| 2011/0103327 A1* | 5/2011 | Lee et al. | ...................... 370/329 |

FOREIGN PATENT DOCUMENTS

| | | |
|---|---|---|
| CN | 101478381 A | 7/2009 |
| CN | 101888593 A | 11/2010 |
| CN | 101959139 A | 1/2011 |
| CN | 102264039 A | 11/2011 |
| KR | 2009-0092708 A | 9/2009 |

(Continued)

OTHER PUBLICATIONS

Translated portion of the foreign reference CN 101478381 A, see attachment.*

(Continued)

*Primary Examiner* — Maharishi Khirodhar
(74) *Attorney, Agent, or Firm* — Kilpatrick Townsend & Stockton LLP (57) ABSTRACT

A method provided in the present application for implementing a semi-persistent scheduling (SPS) includes: a user equipment (UE) determining an Multimedia Broadcast multicast service Single Frequency Network (MBSFN) subframe; and the UE receiving an SPS transmission data packet in the MBSFN subframe, in order to achieve semi-persistent scheduling via a MBSFN subframe.

6 Claims, 6 Drawing Sheets

(56) References Cited

FOREIGN PATENT DOCUMENTS

| | | | |
|---|---|---|---|
| KR | 2010-0036212 | A | 4/2010 |
| KR | 2010-0092028 | A | 8/2010 |
| WO | 2010/121194 | A1 | 10/2010 |

OTHER PUBLICATIONS

International Search Report for PCT/CN2012/073544, amiled Jul. 5, 2012, 4 pages.
3GPP TSG RAN WG2 #73 bis, Apr. 11-15, 2011, Shanghai, China.

* cited by examiner

SEMI-PERSISTENT SCHEDULING METHOD AND APPARATUS

CROSS-REFERENCE TO RELATED APPLICATIONS

The present application is a US National Stage of International Application No. PCT/CN2012/073544, filed 5 Apr. 2012, designating the United States, and claiming priorities to Chinese Patent Application No. 201110112001.1, filed with the State Intellectual Property Office of China on Apr. 29, 2011 and entitled "Method and apparatus for semi-persistent scheduling transmission", and Chinese Patent Application No. 201110218724.X, filed with the State Intellectual Property Office of China on Aug. 1, 2011 and entitled "Method and apparatus for semi-persistent scheduling transmission", both of which are hereby incorporated by reference in their entireties.

FIELD OF THE INVENTION

The present invention relates to the field of communication technologies and particularly to a method and apparatus for Semi-Persistent Scheduling (SPS) transmission.

BACKGROUND OF THE INVENTION

A Multimedia Broadcast/Multicast Service (MBMS) provides a multimedia broadcast/multicast service for a user in a radio cell. In a Long Term Evolution (LTE) system, an MBMS can be provided at both a frequency layer specific to the MBMS and a frequency layer shared with a non-MBMS service. An LTE cell supporting an MBMS can be an MBMS-specific cell or an MBMS and unicast hybrid cell. An MBMS can be transmitted in a single cell or in a plurality of cells. Multi-cell transmission of an MBMS needs to support a Multimedia Broadcast multicast service Single Frequency Network (MBSFN) transmission mode.

The MBSFN transmission mode refers to synchronous transmission in a plurality of cells at the same frequency at the same time. The use of this transmission mode can save a frequency resource and improve a spectrum utilization ratio. It requires the plurality of cells to transmit the same content at the same time, thus a User Equipment (UE) can regard the plurality of MBSFN cells as a large cell. Therefore, the UE cannot be subject to interference of a signal from an adjacent cell but can benefit from superposition of signals from the plurality of MBSFN cells. Both the MBMS-specific cell and the MBMS and unicast hybrid cell can adopt the MBSFN transmission mode. Moreover, if an advanced UE receiver technology is utilized, the problem of a time difference in multi-path propagation can be addressed, to eliminate intra-cell interference. A diversity effect resulting from such multi-cell transmission at the same frequency can further address the problem of coverage of a dead zone, to enhance the reliability of reception and improve a coverage ratio.

MBMS multi-cell transmission have the follow technical features:

There is synchronous transmission of an MBMS in an MBSFN area;

Integration of multi-cell MBMS transmission is supported;

Logic channels, i.e., a Multicast Traffic Channel (MTCH) and a Multicast Control Channel (MCCH), are mapped to a transmission channel for Point to Multipoint (PTM) transmission, i.e., a Multicast Channel (MCH) and further to a Physical Channel, i.e., a Physical Multicast Channel (PMCH);

The MBSFN synchronization area can be configured semi-statically, for example, by Operation & Maintenance (O&M); and A first 1 to 2 symbols in an MBSFN sub-frame are control symbols bearing a PDCCH for unicast transmission scheduling, and following symbols are a data field bearing the PMCH when there is an MBMS to be transmitted.

Logic channels related to MBMS transmission generally include a Broadcast Control Channel (BCCH), the MCCH and the MTCH.

The respective channels generally have the following functions.

The Broadcast Control Channel (BCCH) is for the network to broadcast system information to the UE. For the MBMS, there are two parts of a broadcast message to be transmitted:

All of MBSFN sub-frames indicated in a System Information Block (SIB) 2; and

An SIB13 schedules notification sub-frame (a notification mechanism for an MCCH change notification) and the MCCH, where the scheduling command is used to indicate for an MBSFN sub-frame for transmitting the notification and the MCCH.

The Multicast Control Channel (MCCH) is a point to multipoint downlink channel for the network to transmit MBMS related control information in the MBSFN area to the UE, where an MCCH can correspond to one or more MTCHs (that is, can carry control information of a plurality of MTCHs). The MCCH can include sub-frame assignment of the MBSFN area, configuration information of the PMCH (or MCH), etc., where the configuration information of the PMCH (or MCH) includes, for example, MBMS session information, data Modulation and Coding Scheme (MCS) configuration, a PMCH sub-frame location and a scheduling period.

The Multicast Traffic Channel (MTCH) is a point to multipoint downlink channel for the network to transmit MBMS data to the UE.

The network indicates the configuration information of the MCCH to the UE over the BCCH (including the SIB2 and the SIB13) and further provides the UE with the PMCH or MCH information over the MCCH, and the UE reads MCH Scheduling Information (MSI) of the specific service over the PMCH or the MCH and thereby can receive the MBMS over the MTCH. An MBSFN sub-frame for transmission of the MBMS is finally indicated by an MCH Scheduling Information Media Access Control (MAC) Control Element (MSI MAC CE).

Figure 1:
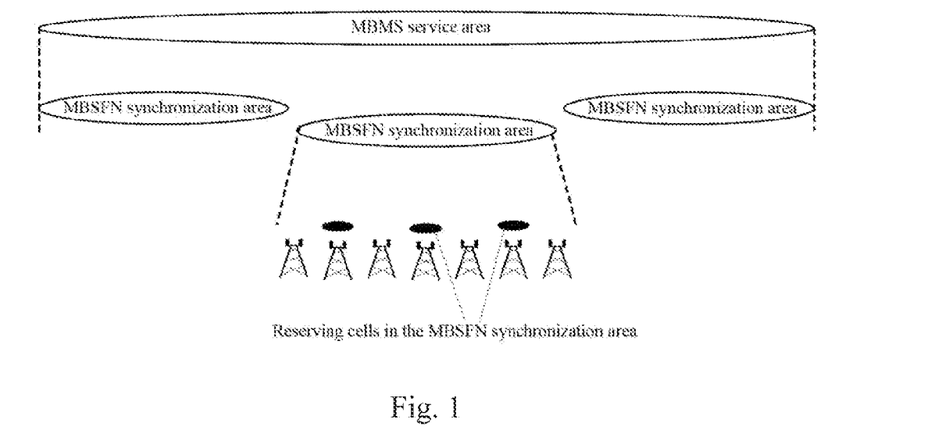
FIG. 1 is a schematic diagram of MBMS-related areas.

FIG. 1 illustrates a relationship between an MBMS service area and MBSFN synchronization areas, etc.

As specified in the physical layer protocol, a UE of an LTE Release 10 (RIO) system can receive data transmitted over a Physical Downlink Shared Channel (PDSCH) in an MBSFN sub-frame. Specifically, only a UE configured with the transmission mode 9 (tm9) by an evolved NodeB (eNB) can receive data, including downlink transmission data of Semi-Persistent Scheduling (SPS), transmitted over a PDSCH in an MBSFN sub-frame.

Figure 2:
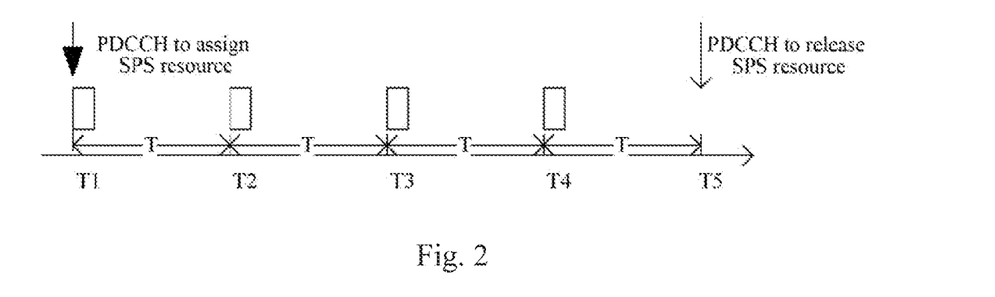
FIG. 2 is a schematic diagram of downlink semi-persistent scheduling transmission in the prior art.

The semi-persistent scheduling transmission has a characterization that an Evolved NodeB (eNB) notifies a UE of information of a semi-persistent scheduling resource assigned for the UE, including a time-frequency resource, a transmission format (e.g., a modulation and coding scheme, etc.), etc., in a scheduling command transmitted over a Physical Downlink Control Channel (PDCCH), and starting from an assigned sub-frame of the semi-persistent scheduling resource, time-frequency resource locations corresponding to subsequent sub-frames spaced at a fixed interval are reserved for the UE to transmit data in the specified transmission format without being further instructed by a PDCCH command, and such semi-persistent scheduling transmission without a scheduling command is also referred to as configured downlink (DL) assignment. Semi-persistent scheduling transmission will not be terminated until the eNB transmits a PDCCH command to release the SPS resources. Referring to FIG. 2, downlink semi-persistent scheduling transmission will be described below as an example.

At a moment of time T1, the eNB transmits a PDCCH command to assign an SPS resource and the first downlink SPS transmission data at the moment of time T1, where information of the SPS time-frequency resource and a transmission format is carried over the PDCCH;

At moments of time T2 to T4, the UE receives the SPS transmission data in the specified transmission format over the specified time-frequency resource in sub-frames spaced at a fixed interval (T), and no further PDCCH command is required for scheduling in these sub-frames, that is, the SPS resources at the moments of time T2 to T4 are pre-configured downlink resources, and such downlink transmission is so-called configured DL assignment; and At a moment of time T5, the eNB transmits PDCCH information to instruct the UE to release the SPS resource so that the UE is instructed to release the originally assigned SPS resource, to terminate the SPS transmission.

However, the existing higher-layer protocol does not support reception of the SPS transmission data by the UE in an MBSFN sub-frame, therefore, the semi-persistent scheduling transmission cannot be implemented in the MBSFN sub-frame in the prior art.

SUMMARY OF THE INVENTION

Embodiments of the invention provide a method and apparatus for semi-persistent scheduling transmission so as to perform semi-persistent scheduling transmission in an MBSFN sub-frame.

An embodiment of the invention provides a method for semi-persistent scheduling transmission, including:
determining, by a UE, an MBSFN sub-frame; and
receiving, by the UE, an SPS transmission data packet in the MBSFN sub-frame.

An embodiment of the invention provides a method for semi-persistent scheduling transmission, including:
determining, by an eNB, an MBSFN sub-frame; and
transmitting, by the eNB, an SPS transmission data packet in the MBSFN sub-frame.

An embodiment of the invention provides an apparatus for semi-persistent scheduling transmission, including:
an MBSFN sub-frame determining unit configured to determine an MBSFN sub-frame; and
an SPS data packet receiving unit configured to receive an SPS transmission data packet in the MBSFN sub-frame.

An embodiment of the invention provides an apparatus for semi-persistent scheduling transmission, including:
an MBSFN sub-frame determining unit configured to determine an MBSFN sub-frame; and
an SPS data packet transmitting unit configured to transmit an SPS transmission data packet in the MBSFN sub-frame.

In the embodiments of the invention, a User Equipment (UE) determines a Multimedia Broadcast multicast service Single Frequency Network (MBSFN) sub-frame; and the UE receives an SPS transmission data packet in the MBSFN sub-frame, thereby performing semi-persistent scheduling transmission in the MBSFN sub-frame.

DETAILED DESCRIPTION OF THE EMBODIMENTS

Embodiments of the invention provide a method and apparatus for semi-persistent scheduling transmission so as to perform semi-persistent scheduling transmission in an MBSFN sub-frame.

Since an MBMS may be transmitted in an MBSFN sub-frame, a semi-persistent scheduling resource may be located in the same sub-frame as an MBMS transmission resource, so the MBMS transmission may collide with configured DL assignment. For a UE, collision of the configured DL assignment with the MBMS transmission cannot be predetermined if the MBMS is not received.

Thus in the embodiments of the invention, the UE attempts to receive semi-persistent scheduling transmission data in the MBSFN sub-frame, and if a decoding error (that is, no semi-persistent scheduling transmission data can be obtained) occurs, then the UE feeds back information to trigger an eNB to perform semi-persistent scheduling transmission again; or the eNB indicates to the UE that there is no configured DL assignment to be performed in the current MBSFN sub-frame, to avoid a resource required for semi-persistent scheduling transmission and a resource required for MBMS transmission from being the same MBSFN sub-frame, thus avoiding semi-persistent scheduling transmission from colliding with MBMS transmission and performing correct semi-persistent scheduling transmission in the MBSFN sub-frame.

Preferably, the UE in the embodiments of the invention refers to a UE configured to be capable of receiving PDSCH transmission data in an MBSFN sub-frame and particularly a UE configured in the transmission mode 9.

A description of the embodiments of the invention will be given below with reference to the drawings.

Figure 3:
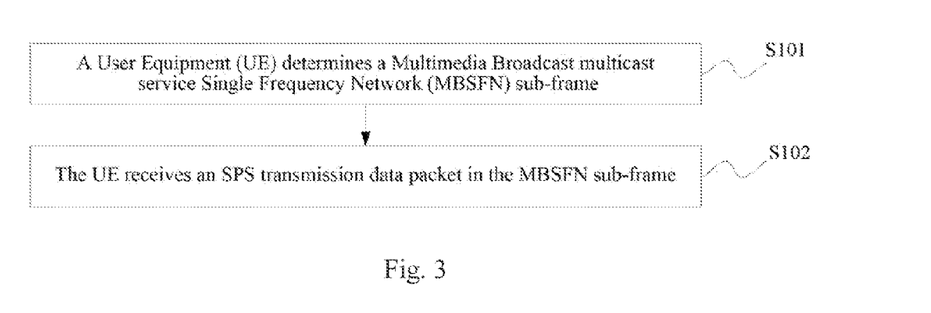
FIG. 3 is a schematic flow chart of a method for semi-persistent scheduling transmission according to an embodiment of the invention.

Referring to FIG. 3, a method for semi-persistent scheduling (SPS) transmission at the UE side according to an embodiment of the invention includes the following steps.

S101. A User Equipment (UE) determines a Multimedia Broadcast multicast service Single Frequency Network (MBSFN) sub-frame.

S102. The UE receives an SPS transmission data packet in the MBSFN sub-frame.

Optionally, the UE receives an SPS transmission data packet in the MBSFN sub-frame includes:

The UE receives in the MBSFN sub-frame and decodes a data packet, borne over a Physical Downlink Shared Channel (PDSCH), transmitted over configured DL assignment by an evolved NodeB (eNB), and transmits Non-Acknowledgement (NACK) information to the eNB upon decoding in error; and The UE receives a retransmitted data packet for the data packet transmitted from the eNB and decodes it in combination with the data packet decoded in error to obtain PDSCH transmitted unicast service data.

Optionally, the UE receives an SPS transmission data packet in the MBSFN sub-frame includes:

The UE receives in the MBSFN sub-frame and decodes a data packet, borne over a Physical Downlink Shared Channel (PDSCH), transmitted over configured DL assignment by an evolved NodeB (eNB), and transmits Non-Acknowledgement (NACK) information to the evolved NodeB (eNB) upon decoding in error;

The UE discards the data packet; or the UE judges whether to discard the data packet, and if so, then the UE discards the data packet; otherwise, the UE reserves the data packet; and The UE receives a retransmitted data packet for the data packet transmitted from the eNB and decodes it in combination with the data packet decoded in error to obtain PDSCH transmitted unicast service data.

Preferably, the UE discards the data packet includes:

The UE determines that MBMS service data is currently being received and that the MBMS service data needs to be transmitted in a sub-frame where the configured DL assignment is located, and then discards the data packet received over the configured DL assignment; and The UE judges whether to discard the data packet, and if so, then the UE discards the data packet; otherwise, the UE reserves the data packet includes:

The UE detects the signal strength of a UE-specific Demodulation Reference Signal (DM-RS) or a Cell-specific Reference Signal (CRS) or a Channel State Information Reference Signal (CSI-RS), and if the signal strength is above a preset threshold, then the UE reserves the data packet; otherwise, the UE discards the data packet.

Optionally, the UE receives an SPS transmission data packet in the MBSFN sub-frame includes:

The UE receives a Physical Downlink Control Channel (PDCCH) scheduling command transmitted from the evolved NodeB (eNB) to release an SPS resource;

The UE releases the SPS resource and receives no downlink unicast service data in the current MBSFN sub-frame according to the scheduling command;

The UE receives a data packet intended to be transmitted over a configured DL assignment according to scheduling by the eNB; and The UE receives an SPS resource assignment command transmitted from the eNB, and determines a subsequently configured downlink semi-persistent scheduling resource according to the command and receives downlink unicast service data.

Optionally, the UE receives an SPS transmission data packet in the MBSFN sub-frame includes:

The UE receives a Physical Downlink Control Channel (PDCCH) scheduling command transmitted from an evolved NodeB (eNB) to indicate that a configured DL assignment in the current MBSFN sub-frame is invalid, and receives no downlink unicast service data in the current MBSFN sub-frame according to the scheduling command;

The UE receives a data packet intended to be transmitted over the configured DL assignment according to scheduling by the eNB; and The UE receives downlink unicast service data over a configured time-frequency resource of a subsequently configured downlink semi-persistent scheduling resource.

Preferably, the PDCCH scheduling command bears Downlink Control Information (DCI), and A Hybrid Automatic Repeat reQuest (HARQ) process number in the DCI is set to a specific code other than all-0; or An upper MSB of an MCS indicator in the DCI is set to 1, and the MCS is not all-1; or A Redundancy Version (RV) number in the DCI is set to a specific code other than all-0; or A resource indicator in the DCI is set to all-0.

Figure 4:
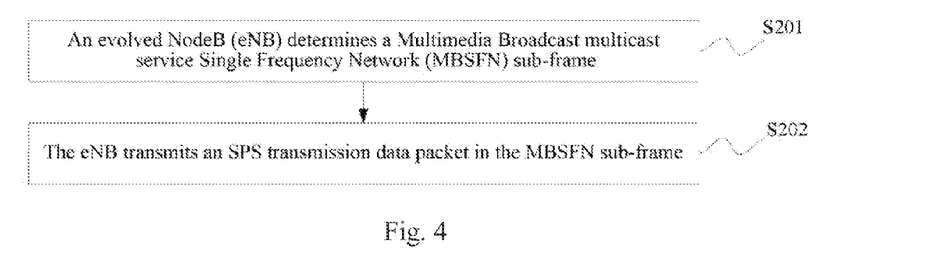
FIG. 4 is a schematic flow chart of a method for semi-persistent scheduling transmission according to an embodiment of the invention.

Referring to FIG. 4, a method for Semi-Persistent Scheduling (SPS) transmission at the eNB side according to an embodiment of the invention includes the following steps.

S201. An evolved NodeB (eNB) determines a Multimedia Broadcast multicast service Single Frequency Network (MBSFN) sub-frame.

S202. The eNB transmits an SPS transmission data packet in the MBSFN sub-frame.

Optionally, the eNB transmits an SPS transmission data packet in the MBSFN sub-frame includes:

The eNB transmits the SPS transmission data packet to a User Equipment (UE) in the MBSFN sub-frame, where the SPS transmission data packet includes a unicast service data packet transmitted over a configured DL assignment; and The eNB receives Non-Acknowledgement (NACK) information transmitted from the UE and transmits a retransmitted data packet for the data packet to the UE according to the NACK information.

Optionally, the eNB transmits an SPS transmission data packet in the MBSFN sub-frame includes:

The eNB detects whether a configured DL assignment is in an MBMS transmission sub-frame and transmits a PDCCH scheduling command to instruct the UE to release an SPS resource upon determining that the configured DL assignment is in an MBMS transmission sub-frame;

The eNB dynamically schedules a data packet intended to be transmitted over the configured DL assignment; and The eNB reassigns an SPS resource in an MBSFN sub-frame free of collision with MBMS transmission and transmits data over the reassigned SPS resource.

Optionally, the eNB transmits an SPS transmission data packet in the MBSFN sub-frame includes:

The eNB detects whether a configured DL assignment is in an MBMS transmission sub-frame and transmits a PDCCH scheduling command to indicate that the configured DL assignment in the current MBSFN sub-frame is invalid upon determining that the configured DL assignment is in an MBMS transmission sub-frame;

The eNB dynamically schedules a data packet intended to be transmitted over the configured DL assignment; and The eNB transmits unicast service data over a subsequently configured downlink semi-persistent scheduling resource.

Preferably, the PDCCH scheduling command bears Downlink Control Information (DCI), and A Hybrid Automatic Repeat reQuest (HARQ) process number in the DCI is set to a specific code other than all-0; or An upper MSB of an MCS indicator in the DCI is set to 1, and the MCS is not all-1; or A Redundancy Version (RV) number in the DCI is set to a specific code other than all-0; or A resource indicator in the DCI is set to all-0.

That is, in the embodiments of the invention, correct semi-persistent scheduling transmission is performed in an MBSFN sub-frame in the following two implementations.

In a first implementation, the UE feeds back information to trigger the eNB to perform semi-persistent scheduling transmission again.

This implementation can be subdivided into the following two implementations.

In an implementation A, the UE attempts to obtain SPS downlink transmission data in an MBSFN sub-frame by decoding a PDSCH transmitted data packet (hereinafter the firstly received data packet), and if there is a decoding error, then the UE feeds back Non-Acknowledgement (NACK) information to the eNB: and the eNB transmits or retransmits a data packet intended to be transmitted over a configured DL assignment upon reception of the NACK information, where the data packet is transmitted or retransmitted subsequently in a dynamic scheduling scheme, possibly over any resource scheduled by the eNB; and upon reception of the subsequent data packet, the UE decodes it in combination with the firstly received data packet into PDSCH transmitted downlink unicast service data. If the UE still fails to perform correct decoding upon reaching a preset maximum number of retransmissions (e.g., four), then the UE discards the firstly received data packet.

The UE may fail to decode the firstly received data packet correctly due to the following two reasons.

The first reason is that the eNB transmits a unicast service data packet.

In this case, it is very likely for the UE to succeed in decoding the subsequently retransmitted data packet together therewith.

The Second reason is that, since an MBMS needs to be transmitted in the current MBSFN sub-frame, the eNB transmits the MBMS in the MBSFN sub-frame instead of a unicast service data packet.

In this case, if the UE decodes a unicast service data packet subsequently transmitted from the eNB in combination with the firstly received data packet, then strong interference is introduced, and possibly no unicast service data packet can be finally decoded correctly.

In an implementation B, the UE attempts to obtain SPS downlink transmission data in an MBSFN sub-frame by decoding a PDSCH transmitted data packet (hereinafter the firstly received data packet), and if there is a decoding error, then the UE feeds back NACK information to the eNB and directly discards the data packet; or the UE judges whether to discard the data packet, and if so, then the UE discards the data packet: otherwise, the UE reserves the data packet.

The UE can judge through activation detection whether to discard the data packet as follows:

The signal strength (which can be the signal power or amplitude, etc. dependent upon an algorithm adopted in practice) of a UE-specific Demodulation Reference Signal (DM-RS) or a Cell-specific Reference Signal (CRS) or a Channel State Information Reference Signal (CSI-RS) is measured, and it is determined whether the data packet transmitted in the current MBSFN sub-frame is a unicast service data packet or an MBMS data packet, and when the signal strength is above a preset threshold, it is determined that the data packet transmitted in the current MBSFN sub-frame is a unicast service data packet; otherwise, it is determined that the data packet transmitted in the current MBSFN sub-frame is an MBMS data packet, where the threshold can be set as required in practice and defined as a value with which the UE can determine whether the eNB transmits the foregoing reference signal. If it is determined that the data packet transmitted in the current MBSFN sub-frame is an MBMS data packet, then the data packet is discarded. If it is determined that the data packet transmitted in the current MBSFN sub-frame is a unicast service data packet, then the data packet is reserved.

If the UE is receiving an MBMS data packet transmitted in the MBSFN sub-frame, then it is determined that no unicast service data packet can be transmitted in the MBSFN sub-frame, and the data packet is discarded directly without judging through activation detection whether to discard the data packet.

The eNB transmits or retransmits a transport block intended to be transmitted over the configured DL assignment upon reception of the NACK information; and upon reception of the subsequent transport block, the UE decodes it with the firstly received data packet into a PDSCH transmitted downlink unicast service data packet. If the UE still fails to perform correct decoding upon reaching a preset maximum number of retransmissions, then the UE discards the firstly received data packet.

The implementation B is different from the implementation A in that the UE can discard the data packet, failing to be decoded, received in the MBSFN sub-frame instead of Hybrid Automatic Repeat reQuest (HARQ)-combining it with the subsequently retransmitted data packet, thereby avoiding the UE from taking the MBMS transmission data packet as a unicast service data packet and consequently introducing strong interference of combined retransmission when MBMS transmission collides with PDSCH transmission. However, since the firstly received data packet is discarded, a combined retransmission gain will be lowered unless there is a decoding error resulting from collision.

The eNB can determine whether an MBMS data packet or a unicast service data packet is actually transmitted in the MBSFN sub-frame, and in the case that no unicast service data packet is actually transmitted in the MBSFN sub-frame, a unicast service data packet can be retransmitted in subsequent retransmission for a first time by adopting a self-decodable redundancy version as a transmission version of the data packet. Furthermore, if a configured semi-persistent scheduling transmission resource is in the MBSFN sub-frame, then the eNB usually adopts a self-decodable redundancy version in subsequent retransmission of a unicast service data packet for a first time.

In a second implementation, the eNB indicates over a PDCCH that there is no configured DL assignment to be performed in the current MBSFN sub-frame, that is, the eNB indicates to the UE that there is no SPS downlink transmission data in the current MBSFN sub-frame.

This second implementation can also be divided into the following two implementations.

Figure 5:
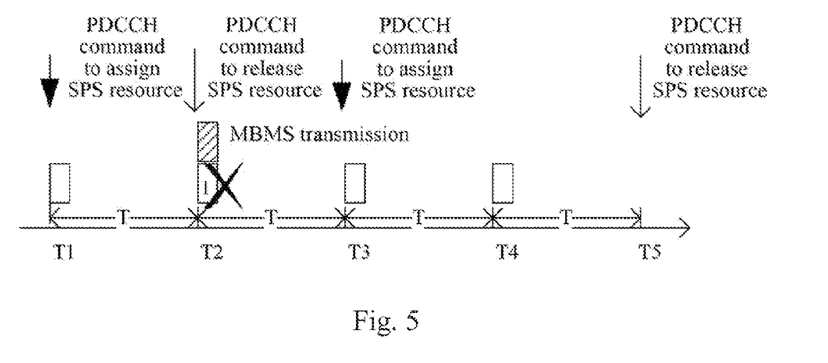
FIG. 5 is a schematic diagram of semi-persistent scheduling transmission in a first implementation according to an embodiment of the invention.

In an implementation C, when downlink transmission configured in the current MBSFN sub-frame collides with MBMS transmission, the eNB transmits a PDCCH command of a resource release instruction so that the UE releases an SPS resource, and the command also instructs the UE to release a subsequently configured DL assignment (that is, the UE releases all of assigned semi-persistent scheduling resources); and the eNB subsequently reassigns an SPS resource. As illustrated in FIG. 5, a unicast service data transport block 1 failing to be transmitted due to collision with MBMS transmission is transmitted from the eNB in a dynamic scheduling scheme after the current MBSFN sub-frame.

Figure 6:
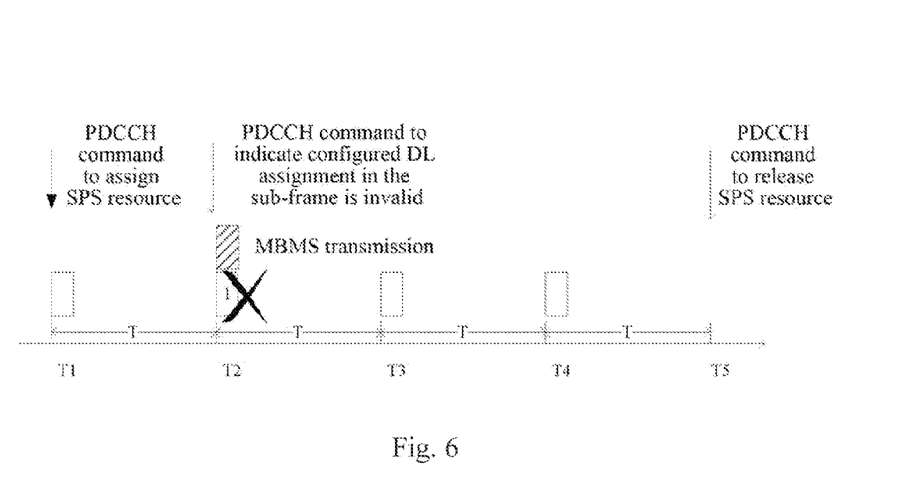
FIG. 6 is a schematic diagram of semi-persistent scheduling transmission in a second implementation according to an embodiment of the invention.

In an implementation D, the eNB indicates in a specific PDCCH command that the current MBSFN sub-frame is unavailable to configured DL assignment but a subsequently configured DL assignment is still valid. Referring to FIG. 6, a unicast service data transport block 1 failing to be transmitted due to collision with MBMS transmission is transmitted from the eNB in a dynamic scheduling scheme after the current MBSFN sub-frame.

In the embodiment of the invention, the PDCCH to indicate that the configured DL assignment is invalid has the following features:

The PDCCH is scrambled by a Semi-Persistent Scheduling Cell Radio Network Temporary Identifier (C-RNTI);

In the format of Downlink Control Information (DCI) carried over the PDCCH, a specific code is adopted to identify the invalid configured DL assignment corresponding to the current MBSFN sub-frame, and the specific code is designed in one or a combination of the following schemes: an HARQ process number is set to a preset specific code other than all-0, for example, "111" for a Frequency Division Duplex (FDD) system, and "1111" for a Time Division Duplex (TDD) system; or an upper Most Significant Bit (MSB) of an MCS indicator is set to 1, and the MCS is not all-1, for example, possibly "10000"; or a Redundancy Version (RV) number is set to a preset specific code other than all-0, for example, possibly "11"; or a resource indicator is set to all-0.

A description of several particular embodiments will be given below.

In a first embodiment, a UE receives a configured downlink transmission data packet in an MBSFN sub-frame, and if the data packet is decoded in error, then the UE decodes it in combination with a subsequent HARQ retransmitted data packet.

Figure 7:
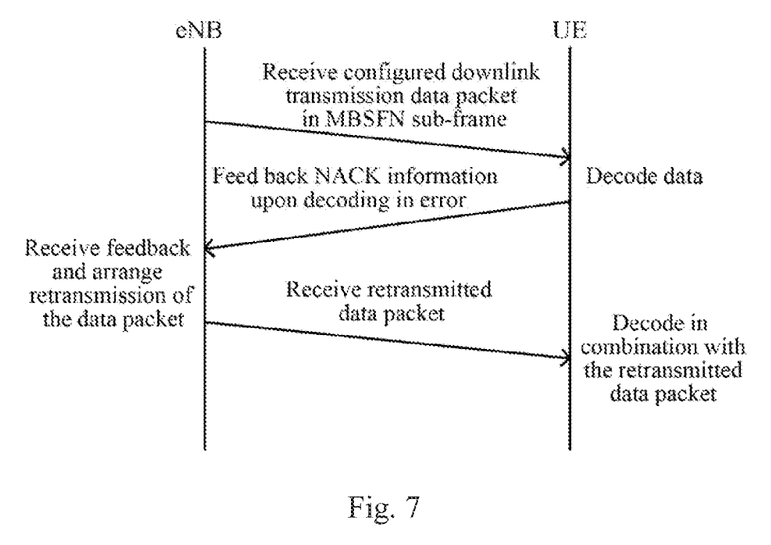
FIG. 7 is a schematic flow chart of a method for semi-persistent scheduling transmission according to a first embodiment of the invention.

Referring to FIG. 7, a method for semi-persistent scheduling transmission in an MBSFN sub-frame according to an embodiment of the invention includes the following steps.

Step 1: A UE receives and decodes a configured downlink transmission data packet in an MBSFN sub-frame, where the downlink transmission data packet has no corresponding PDCCH scheduling indicator in the current MBSFN sub-frame.

Step 2: If there is a decoding error, then the UE feeds NACK information back to an eNB.

Step 3: The eNB receives the fed-back NACK information and arranges retransmission scheduling of the data packet, and if an MBMS data packet is actually transmitted in the configured downlink transmission sub-frame in the step 1, then the eNB adopts a self-decodable redundancy version, e.g., RV0, in arranging the retransmission of the data packet.

Step 4: The UE receives a retransmitted data packet, which is scheduled by a PDCCH scheduling command, possibly in an MBSFN sub-frame or a non-MBSFN sub-frame.

Step 5: The UE decodes the retransmitted data packet in combination with the data packet received in the step 1.

If decoding is still incorrect, then the steps 2 to 5 are repeated until decoding is correct or the maximum number of retransmissions is reached.

In a second embodiment, a UE receives a configured downlink transmission data packet in an MBSFN sub-frame, detects whether to discard the data packet and decodes it in combination with a subsequent retransmitted data packet as needed.

Figure 8:
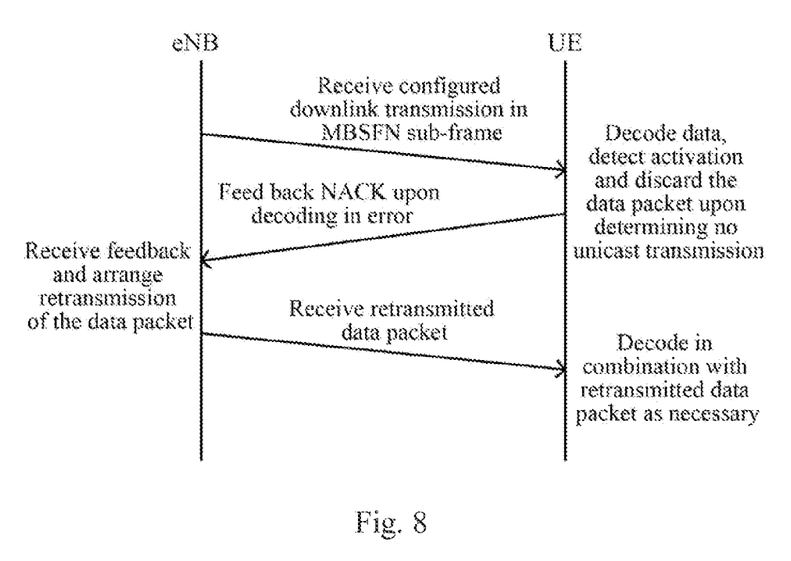
FIG. 8 is a schematic flow chart of a method for semi-persistent scheduling transmission according to a second embodiment of the invention.

Referring to FIG. 8, a method for semi-persistent scheduling transmission in an MBSFN sub-frame according to an embodiment of the invention includes the following steps.

Step 1: A UE receives and decodes a configured downlink transmission data packet in an MBSFN sub-frame, where the downlink transmission data packet has no corresponding PDCCH scheduling indicator in the current MBSFN sub-frame.

Step 2: If there is a decoding error, then the UE feeds NACK information back to an eNB and performs activation detection. In an activation detection method, the strength of a UE-specific Demodulation Reference Signal (DM-RS) or a Cell-specific Reference Signal (CRS) or a Channel State Information Reference Signal (CSI-RS) is measured, and if the strength of the foregoing reference signal is above a preset threshold, then it is determined that there is unicast service data in the current MBSFN sub-frame; otherwise, it is determined that there is no unicast service data in the current MBSFN sub-frame. If it is determined through activation detection that there is no unicast service data in the current MBSFN sub-frame, then the data packet is discarded.

Step 3: The eNB receives the fed-back NACK information and arranges retransmission scheduling of the data packet, and if an MBMS data packet is actually transmitted in the configured downlink transmission sub-frame in the step 1, then the eNB adopts a self-decodable redundancy version, e.g., RV0, in arranging the retransmission of the data packet.

Step 4: The UE receives a retransmitted data packet, which is scheduled by a PDCCH scheduling command, possibly in an MBSFN sub-frame or a non-MBSFN sub-frame.

Step 5: If the data packet received in the step 1 is not discarded through activation detection, then the UE decodes the received retransmitted data packet in combination with the data packet received in the step 1; otherwise, the UE decodes only the received retransmitted data packet.

If decoding is still incorrect, then the steps 2 to 5 are repeated until decoding is correct or the maximum number of retransmissions is reached.

In a third embodiment, an eNB releases an SPS resource when MBMS transmission collides with a configured DL assignment.

Figure 9:
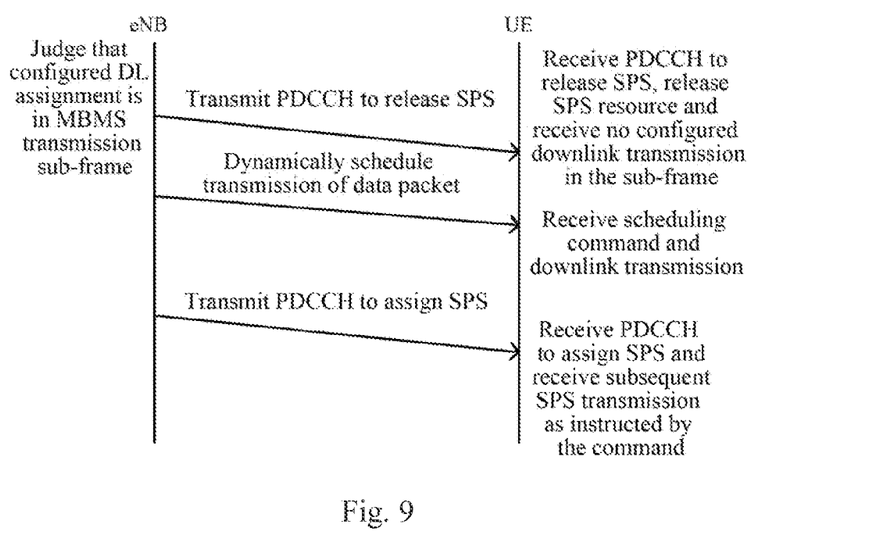
FIG. 9 is a schematic flow chart of a method for semi-persistent scheduling transmission according to a third embodiment of the invention.

Referring to FIG. 9, a method for semi-persistent scheduling transmission in an MBSFN sub-frame according to an embodiment of the invention includes the following steps.

Step 1: An eNB detects whether a configured DL assignment is in an MBMS transmission sub-frame, and when it is determined that the configured DL assignment is in an MBMS transmission sub-frame, the eNB transmits a PDCCH scheduling command to instruct a UE to release an SPS resource.

Step 2: The UE receives the PDCCH scheduling command to instruct the UE to release the SPS resource and then releases the SPS resource and receives no configured downlink transmission data packet in the current sub-frame.

Step 3: The eNB dynamically schedules in a subsequent sub-frame a data packet intended to be transmitted over the configured DL assignment, where dynamical scheduling refers to that the eNB instructs the UE in a PDCCH command in a selected sub-frame to receive downlink transmission data in a specified transmission format over a specified resource of the sub-frame.

Step 4: The UE receives the downlink data according to dynamical scheduling by the eNB to receive the data packet intended to be transmitted over the configured DL assignment.

The eNB can continue with dynamic scheduling over any resource of any sub-frame.

Dynamic scheduling is different from semi-persistent scheduling in that the former schedules one transmission in one PDCCH scheduling command.

Step 5: The eNB reassigns an SPS resource in an MBSFN sub-frame free of collision with MBMS transmission.

Step 6: The UE receives an SPS resource assignment command and receives subsequent SPS data as instructed by the SPS resource assignment command.

In a fourth embodiment, an eNB indicates in a specific PDCCH command that a configured DL assignment in the current MBSFN sub-frame is invalid.

Figure 10:
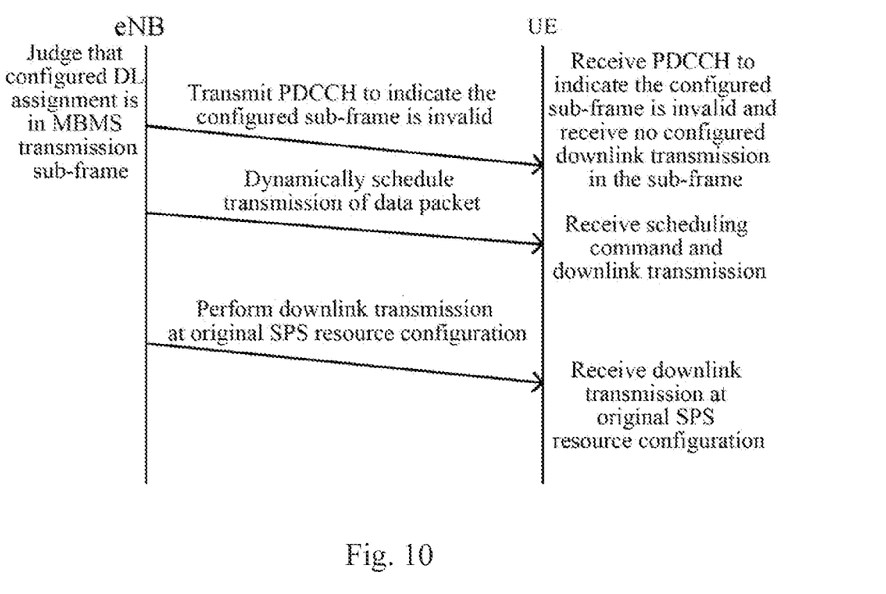
FIG. 10 is a schematic flow chart of a method for semi-persistent scheduling transmission according to a fourth embodiment of the invention.

Referring to FIG. 10, a method for semi-persistent scheduling transmission in an MBSFN sub-frame according to an embodiment of the invention includes the following steps.

Step 1: An eNB detects whether a configured DL assignment is in an MBMS transmission sub-frame, and when it is determined that the configured DL assignment is in an MBMS transmission sub-frame, the eNB transmits a specific PDCCH scheduling command to indicate the configured DL assignment in the current MBSFN sub-frame is invalid, where the specific PDCCH complies with the design principle described in the implementation D.

Step 2: The UE receives the specific PDCCH scheduling command and receives no configured downlink transmission in the current MBSFN sub-frame.

Step 3: The eNB dynamically schedules in a subsequent MBSFN sub-frame a data packet intended to be transmitted over the configured DL assignment.

Step 4: The UE receives downlink data according to scheduling by the eNB to receive the data packet intended to be transmitted over the configured DL assignment.

Step 5: The UE continues with receiving a configured downlink transmission data packet over an SPS configured time-frequency resource in a subsequent sub-frame.

A system for Semi-Persistent Scheduling (SPS) transmission according to an embodiment of the invention includes an eNB and at least one UE.

Figure 11:
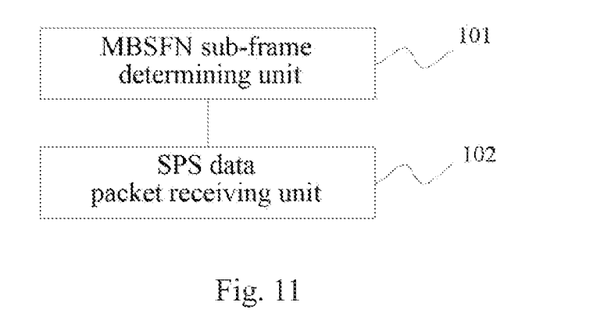
FIG. 11 is a schematic structural diagram of an apparatus for Semi-Persistent Scheduling (SPS) transmission according to an embodiment of the invention.

Referring to FIG. 11, an apparatus for Semi-Persistent Scheduling (SPS) transmission at the UE side according to an embodiment of the invention includes:

An MBSFN sub-frame determining unit 101 configured to determine a Multimedia Broadcast multicast service Single Frequency Network (MBSFN) sub-frame; and An SPS data packet receiving unit 102 configured to receive an SPS transmission data packet in the MBSFN sub-frame.

Optionally, the SPS data packet receiving unit 102 includes:

An NACK feeding-back unit configured to receive in the MBSFN sub-frame and decode a data packet, borne over a Physical Downlink Shared Channel (PDSCH), transmitted over a configured DL assignment by an evolved NodeB (eNB), and to transmit Non-Acknowledgement (NACK) information to the eNB upon decoding in error; and A combination-decoding unit configured to receive a retransmitted data packet for the data packet transmitted from the eNB and to decode it in combination with the data packet decoded in error to obtain PDSCH transmitted unicast service data.

Optionally, the SPS data packet receiving unit 102 includes:

An NACK feeding-back unit configured to receive in the MBSFN sub-frame and decodes a data packet, borne over a Physical Downlink Link Shared Channel (PDSCH), transmitted over a configured DL assignment by an evolved NodeB (eNB), and to transmit Non-Acknowledgement (NACK) information to the evolved NodeB (eNB) upon decoding in error;

A data packet discarding unit configured to discard the data packet; or to judge whether to discard the data packet, and if so, to discard the data packet; otherwise, to reserve the data packet; and A combination-decoding unit configured to receive a retransmitted data packet for the data packet transmitted from the eNB and to decode it in combination with the data packet decoded in error to obtain PDSCH transmitted unicast service data.

Preferably, the data packet discarding unit determines that MBMS service data is currently being received and that the MBMS service data needs to be transmitted in a sub-frame where the configured DL assignment is located, and then discards the data packet received over the configured DL assignment; or The data packet discarding unit detects the signal strength of a UE-specific Demodulation Reference Signal (DM-RS) or a Cell-specific Reference Signal (CRS) or a Channel State Information Reference Signal (CSI-RS), and if the signal strength is above a preset threshold, then it reserves the data packet; otherwise, it discards the data packet.

Optionally, the SPS data packet receiving unit 102 includes:

An SPS resource release command receiving unit configured to receive a Physical Downlink Control Channel (PDCCH) scheduling command transmitted from an evolved NodeB (eNB) to release an SPS resource;

An SPS resource releasing unit configured to release the SPS resource and receive no downlink unicast service data in the current MBSFN sub-frame according to the scheduling command;

A data packet receiving unit configured to receive a data packet intended to be transmitted over a configured DL assignment according to scheduling by the eNB; and An SPS receiving unit configured to receive an SPS resource assignment command transmitted from the eNB, and to determine a subsequently configured downlink semi-persistent scheduling resource according to the command and receive downlink unicast service data.

Optionally, the SPS data packet receiving unit 102 includes:

An invalid resource command receiving unit configured to receive a Physical Downlink Control Channel (PDCCH) scheduling command transmitted from an evolved NodeB (eNB) to indicate that a configured DL assignment in the current MBSFN sub-frame is invalid, and to receive no downlink unicast service data in the current MBSFN sub-frame according to the scheduling command;

A data packet receiving unit configured to receive a data packet intended to be transmitted over the configured DL assignment according to scheduling by the eNB; and An SPS receiving unit configured to receive downlink unicast service data over a configured time-frequency resource at a subsequently configured downlink semi-persistent scheduling resource.

Preferably, the PDCCH scheduling command has the following features:

The PDCCH scheduling command bears Downlink Control Information (DCI), and

A Hybrid Automatic Repeat reQuest (HARQ) process number in the DCI is set to a specific code other than all-0; or An upper MSB of an MCS indicator in the DCI is set to 1, and the MCS is not all-1; or A Redundancy Version (RV) number in the DCI is set to a specific code other than all-0; or A resource indicator in the DCI is set to all-0.

With the forgoing features, the invalid resource command receiving unit determines reception of the PDCCH scheduling command transmitted from the eNB to indicate the configured DL assignment in the current MBSFN sub-frame is invalid.

The foregoing respective divisions of the SPS data packet receiving unit 102 into the units are merely preferred divisions, and of course, other divisions are also possible, and a detailed description thereof will be omitted here.

Figure 12:
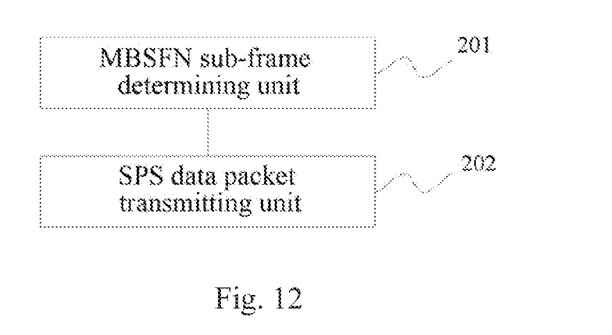
FIG. 12 is a schematic structural diagram of an apparatus for Semi-Persistent Scheduling (SPS) transmission according to an embodiment of the invention.

Referring to FIG. 12, an apparatus for Semi-Persistent Scheduling (SPS) transmission at the eNB side according to an embodiment of the invention includes:

An MBSFN sub-frame determining unit 201 configured to determine a Multimedia Broadcast multicast service Single Frequency Network (MBSFN) sub-frame; and An SPS data packet transmitting unit 202 configured to transmit an SPS transmission data packet in the MBSFN sub-frame.

Optionally, the SPS data packet transmitting unit 202 includes:

A first transmitting unit configured to transmit the SPS transmission data packet to a User Equipment (UE) in the MBSFN sub-frame, where the SPS transmission data packet includes a unicast service data packet transmitted over a configured DL assignment; and A second transmitting unit configured to receive Non-Acknowledgement (NACK) information transmitted from the UE and to transmit a retransmitted data packet for the data packet to the UE according to the NACK information.

Optionally, the SPS data packet transmitting unit 202 includes:

An SPS resource release command transmitting unit configured to detect whether a configured DL assignment is in an MBMS transmission sub-frame and to transmit a PDCCH scheduling command to instruct the UE to release an SPS resource upon determining that the configured DL assignment is in an MBMS transmission sub-frame;

A dynamic scheduling unit configured to dynamically schedule a data packet intended to be transmitted over the configured DL assignment; and An SPS resource reassigning unit configured to reassign an SPS resource in an MBSFN sub-frame free of collision with MBMS transmission and to transmit data over the reassigned SPS resource.

Optionally, the SPS data packet transmitting unit 202 includes:

An invalid resource command transmitting unit configured to detect whether a configured DL assignment is in an MBMS transmission sub-frame and to transmit a PDCCH scheduling command to indicate that the configured DL assignment in the current MBSFN sub-frame is invalid upon determining that the configured DL assignment is in an MBMS transmission sub-frame;

A dynamic scheduling unit configured to dynamically schedule a data packet intended to be transmitted over the configured DL assignment; and An SPS transmitting unit configured to transmit unicast service data over a subsequently configured downlink semi-persistent scheduling resource.

Preferably, the PDCCH scheduling command transmitted by the invalid resource command transmitting unit has the following features:

The PDCCH scheduling command bears Downlink Control Information (DCI), and

A Hybrid Automatic Repeat reQuest (HARQ) process number in the DCI is set to a specific code other than all-0; or An upper MSB of an MCS indicator in the DCI is set to 1, and the MCS is not all-1; or A Redundancy Version (RV) number in the DCI is set to a specific code other than all-0; or A resource indicator in the DCI is set to all-0.

Similarly, the foregoing respective divisions of the SPS data packet transmitting unit 202 into the units are merely preferred divisions, and of course, other divisions are also possible, and a detailed description thereof will be omitted here.

In summary, in the embodiments of the invention, a UE receives a semi-persistent scheduling transmission data packet in an MBSFN sub-frame, and the UE makes a feedback to trigger retransmission or an eNB indicates that no configured downlink transmission data packet is received in the sub-frame, thereby performing correct transmission of semi-persistent scheduling transmission data in the MBSFN sub-frame.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for Semi-Persistent Scheduling, SPS, transmission, comprising:
   determining, by a User Equipment, UE, a Multimedia Broadcast multicast service Single Frequency Network, MBSFN, sub-frame; and
   receiving, by the UE, an SPS transmission data packet in the MBSFN sub-frame, wherein receiving by the UE an SPS transmission data packet in the MBSFN sub-frame comprises:
   receiving, by the UE, in the MBSFN sub-frame and decoding a data packet, borne over a Physical Downlink Shared Channel, PDSCH, transmitted over a configured downlink assignment by an evolved NodeB, eNB, and transmitting Non-Acknowledgement, NACK, information to the evolved NodeB, eNB, upon decoding in error;
   discarding, by the UE, the data packet transmitted by the eNB; or judging, by the UE, whether to discard the data packet, and if so, then discarding the data packet; otherwise, reserving the data packet; and
   receiving, by the UE, a retransmitted data packet for the data packet transmitted from the eNB and decoding it in combination with the data packet decoded in error to obtain PDSCH transmitted unicast service data.

2. The method according to claim 1, wherein discarding by the UE the data packet comprises:
   determining, by the UE, that MBMS service data is currently being received and that the MBMS service data needs to be transmitted in a sub-frame where the configured downlink assignment is located, and then discarding the data packet received over the configured downlink assignment;
   and wherein judging by the UE whether to discard the data packet, and if so, then discarding the data packet; otherwise, reserving the data packet comprises:
   detecting, by the UE, the signal strength of a UE-specific Demodulation Reference Signal, DM-RS, or a Cell-specific Reference Signal, CRS, or a Channel State Information Reference Signal, CSI-RS, and if the signal strength is above a preset threshold, then reserving the data packet; otherwise, discarding the data packet.

3. A method for Semi-Persistent Scheduling, SPS, transmission, comprising:
   determining, by an evolved NodeB, eNB, a Multimedia Broadcast multicast service Single Frequency Network, MBSFN, sub-frame; and
   transmitting, by the eNB, an SPS transmission data packet in the MBSFN sub-frame,
   wherein transmitting by the eNB an SPS transmission data packet in the MBSFN sub-frame comprises:
   transmitting, by the eNB, the SPS transmission data packet to a User Equipment, UE, in the MBSFN sub-frame, wherein the SPS transmission data packet comprises a unicast service data packet transmitted over a configured downlink assignment; and receiving, by the eNB, Non-Acknowledgement, NACK, information transmitted from the UE and transmitting a retransmitted data packet for the data packet to the UE according to the NACK information;
   or
   wherein transmitting by the eNB an SPS transmission data packet in the MBSFN sub-frame comprises:
   detecting, by the eNB, whether a configured downlink assignment is in an MBMS transmission sub-frame and transmitting a PDCCH scheduling command to indicate that the configured downlink assignment in the current MBSFN sub-frame is invalid upon determining that the configured downlink assignment is in the MBMS transmission sub-frame; scheduling, by the eNB, dynamically a data packet intended to be transmitted over the configured downlink assignment; and transmitting, by the eNB, unicast service data over a subsequently configured downlink semi-persistent scheduling resource.

4. An apparatus for Semi-Persistent Scheduling, SPS, transmission, comprising one or more processors configured to:
   determine a Multimedia Broadcast multicast service Single Frequency Network, MBSFN, sub-frame; and
   receive an SPS transmission data packet in the MBSFN sub-frame, wherein the one or more processors are configured to receive in the MBSFN sub-frame and decodes a data packet, borne over a Physical Downlink Link Shared Channel, PDSCH, transmitted over a configured downlink assignment by an evolved NodeB, eNB, and to transmit Non-Acknowledgement, NACK, information to the evolved NodeB, eNB, upon decoding in error;
   to discard the data packet transmitted by the eNB; or to judge whether to discard the data packet, and if so, to discard the data packet; otherwise, to reserve the data packet; and
   to receive a retransmitted data packet for the data packet transmitted from the eNB and to decode it in combination with the data packet decoded in error to obtain PDSCH transmitted unicast service data.

5. The apparatus according to claim 4, wherein:
   the one or more processors determine that MBMS service data is currently being received and that the MBMS service data needs to be transmitted in a sub-frame where the configured downlink assignment is located, and then discard the data packet received over the configured downlink assignment;
   or
   the one or more processors detect-the signal strength of a UE-specific Demodulation Reference Signal, DM-RS, or a Cell-specific Reference Signal, CRS, or a Channel State Information Reference Signal, CSI-RS, and if the signal strength is above a preset threshold, then the one or more processors reserve the data packet; otherwise, the one or more processors discard the data packet.

6. An apparatus for Semi-Persistent Scheduling, SPS, transmission, comprising one or more processors configured to:
   determine a Multimedia Broadcast multicast service Single Frequency Network, MBSFN, sub-frame; and transmit an SPS transmission data packet in the MBSFN sub-frame, wherein the one or more processors are configured to transmit the SPS transmission data packet to a User Equipment, UE, in the MBSFN sub-frame, wherein the SPS transmission data packet comprises a unicast service data packet transmitted over a configured downlink assignment; and to receive Non-Acknowledgement, NACK, information transmitted from the UE and to transmit a retransmitted data packet for the data packet to the UE according to the NACK information;

or wherein the one or more processors are configured to detect whether a configured downlink assignment is in an MBMS transmission sub-frame and transmit a PDCCH scheduling command to indicate that the configured downlink assignment in the current MBSFN sub-frame is invalid upon determining that the configured downlink assignment is in the MBMS transmission sub-frame; to schedule dynamically a data packet intended to be transmitted over the configured downlink assignment; and to transmit unicast service data over a subsequently configured downlink semi-persistent scheduling resource.

* * * * *